United States Patent
Hisazumi et al.

(10) Patent No.: US 9,248,865 B2
(45) Date of Patent: Feb. 2, 2016

(54) VEHICLE BODY FRONT STRUCTURE

(71) Applicant: HONDA MOTOR CO., LTD., Minato-ku, Tokyo (JP)

(72) Inventors: Makoto Hisazumi, Wako (JP); Naoyuki Hashimoto, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/388,519

(22) PCT Filed: Dec. 13, 2012

(86) PCT No.: PCT/JP2012/082303
§ 371 (c)(1),
(2) Date: Sep. 26, 2014

(87) PCT Pub. No.: WO2013/145457
PCT Pub. Date: Oct. 3, 2013

(65) Prior Publication Data
US 2015/0054312 A1      Feb. 26, 2015

(30) Foreign Application Priority Data

Mar. 28, 2012 (JP) .................................. 2012-073653

(51) Int. Cl.
*B62D 25/08* (2006.01)
(52) U.S. Cl.
CPC .................................... *B62D 25/082* (2013.01)
(58) Field of Classification Search
CPC .............................. B62D 25/082; B62D 25/085
USPC ................... 296/187.09, 193.09, 198, 203.02
See application file for complete search history.

(56) References Cited

U.S. PATENT DOCUMENTS

| 8,684,451 | B1* | 4/2014 | Park et al. ................. | 296/203.02 |
| 8,789,874 | B2* | 7/2014 | Okamura et al. ........ | 296/187.09 |
| 8,857,902 | B2* | 10/2014 | Sekiguchi et al. ....... | 296/193.09 |
| 2009/0146455 | A1* | 6/2009 | Honji et al. .............. | 296/187.09 |

(Continued)

FOREIGN PATENT DOCUMENTS

| JP | 2007-038961 A | 2/2007 |
| JP | 2007-091000 A | 4/2007 |

(Continued)

OTHER PUBLICATIONS

Japanese Office Action, Notification of Reasons for Refusal, issued in the corresponding JP Patent Application 2014-507327, with a mailing date of May 19, 2015, with the English translation thereof.

*Primary Examiner* — Jason S Morrow
(74) *Attorney, Agent, or Firm* — Carrier Blackman & Associates, P.C.; Joseph P. Carrier; Jeffrey T. Gedeon

(57) ABSTRACT

A vehicle body front structure (15) includes a side beam member (38) extending toward the rear of the vehicle body from a bulkhead (24). One end (41) of an upper member (28) is connected to the side beam member (38). The other end (46) of the upper member (28) is connected to a front pillar (45). The upper member (28) is divided into an upper front-side member (47) that includes the one end (41) and an upper rear-side member (48) that includes the other end (46). A lower member (32) extends downward from the upper front-side member (47). The upper member (28) is divided at a position near a housing front wall (57) of a damper housing (26).

4 Claims, 11 Drawing Sheets

(56) References Cited

U.S. PATENT DOCUMENTS

2012/0248819 A1* 10/2012 Okamura et al. .......... 296/187.1
2015/0061320 A1* 3/2015 Yabu et al. ................. 296/187.1

FOREIGN PATENT DOCUMENTS

| | | |
|---|---|---|
| JP | 2007-191061 A | 8/2007 |
| JP | 2009-001035 A | 1/2009 |

* cited by examiner

VEHICLE BODY FRONT STRUCTURE

TECHNICAL FIELD

The present invention relates to a vehicle body front structure having left and right wheelhouse upper members extending forwardly from a passenger compartment and front fenders supported by the wheelhouse upper members.

BACKGROUND ART

In a vehicle body front structure of that type, left and right wheelhouse upper members to which left and right front fenders are fastened, respectively, are contiguous with a front bulkhead on a front side of a vehicle. The wheelhouse upper member has a front end joined to a bulkhead side member extending rearwardly from the front bulkhead at the front side of the vehicle. A lower member extends from a vicinity of the front end and has a lower end contiguous with a front side frame to ensure strength. An extension member extends from an upper end of the lower member and is joined to the wheelhouse upper member, as disclosed in JP-A-2009-1035.

For the vehicle body front structure disclosed in JP-A-2009-1035, however, a hole of a front fender would not be aligned with an internal thread of a fender bracket on a side of the wheelhouse upper member in fastening the front fender to the wheelhouse upper member with a screw member.

Where to mount the fender bracket depends upon the design. For example, the fender bracket is mounted on the wheelhouse upper member. The step of attaching the wheelhouse upper member with the fender bracket mounted thereon is the final step of the process of assembling the front body of the vehicle. As a result, positions of external threads of the fender brackets fixed to the wheelhouse upper members can vary widely relative to different fender brackets mounted earlier than the fender brackets fixed to the wheelhouse upper members. To avoid this problem, the front body of the vehicle is required to be designed under limited conditions requiring, e.g., mounting the fender bracket not to the wheelhouse upper member but to a member which is to be mounted before the step of attaching the wheelhouse upper bracket. Since the design of the front body of the vehicle is subject to that limitation, improvement, of the freedom to design the front body is desired. That is, it is desirable that the positions of the fender brackets on the wheelhouse upper members vary as little as possible. In addition, it is necessary to reduce the number of parts and manufacturing steps as well as the cost.

PRIOR ART LITERATURE

Patent Literature

Patent Literature 1: JP-A-2009-1035

SUMMARY OF INVENTION

Technical Problem

It is an object of the present invention is to provide a vehicle body front structure designed to improve accuracy of location of an external thread of a fender bracket on a side of a wheelhouse upper member as well as to reduce the number of parts, manufacturing steps and cost of the structure.

Solution to Problem

According to the present invention defined in claim 1, there is provided a vehicle body front structure comprising: a bulkhead disposed at a front side of a vehicle body and extending in a widthwise direction of a vehicle; left and right side beam members extending from an upper beam member of the bulkhead in a rearward direction of the vehicle body; front pillars supporting left and right ends of a windshield; and left and right upper members having one ends connected to the side beam members and opposite ends connected to the front pillars, wherein each of the left and right upper members divides into an upper front side member and an upper rear side member, the upper front side members of the left and right upper members having the one ends, the upper rear side members of the upper members having the opposite ends, and wherein left and right lower members extend from the upper front side members in a downward direction of the vehicle body.

In the invention defined in claim 2, preferably, the respective left and right upper members are disposed at top portions of opposite lateral sides of an engine compartment, and joined to widthwise outer sides of left and right damper housings supporting suspensions, the damper housings including housing front walls having front surfaces facing in a forward direction of the vehicle body, the left and right upper members dividing into the upper front side members and the upper rear side members at locations close to the housing front walls of the damper housings. Also, the upper front side members include division ends located on sides of the one ends, and front outer wall sections having surfaces facing in widthwise outward directions of the vehicle, and fender brackets for mounting fenders, the fender brackets being disposed at the front outer wall sections on sides of the division ends.

In the invention defined in claim 3, preferably, the fender brackets are joined to the front outer wall sections and to the lower members.

In the invention defined in claim 4, preferably, the lower members are integrally plastically worked members, the lower members overlapping the front outer wall sections of the upper front side members from outside the vehicle and being joined to the front outer wall sections.

In the invention defined in claim 5, preferably, each of the left and right side beam members has a rear end fitting over and connected to the one end of the upper front side member, the rear end having a fitting flange, the fitting flange projecting and having a peripheral edge of the rear end, the peripheral edge being spaced outward from the one end with a gap defined between the peripheral edge and the one end.

Advantageous Effects of Invention

In the invention defined in claim 1, the vehicle body front structure includes the upper members having the one ends connected to the left and right side beam members extending rearwardly from the bulkhead. The opposite ends of the upper members are connected to the front pillars. The upper member divides into the upper front side member including the one end of the upper member, and the upper rear side member including the opposite end of the upper member. The lower member extends from the upper front side member in the downward direction of the vehicle. In the process of assembling the vehicle body front structure, the upper front side member with the lower member is attached to the vehicle body in an earlier step of the process unlike the non-divided upper member required to support the lower member at the timing of attachment of the non-divided upper member. This means that it is not necessary to provide another extension member between the lower member and the non-divided upper member, as is conventional. That is, the vehicle body front structure can be assembled through the reduced number of steps using the reduced number of parts without any extension member.

A minimum high tension steel sheet ensuring a strength necessary to withstand an impact on a vehicle when subjected to a head-on collision is used for only the upper rear side member of the upper member. This leads to the cost reduction.

In the invention defined in claim 2, the upper member is joined to the damper housing, such that rigidity is ensured to provide an appropriate load path (load transmission route) for an impact load applied to a front side of the vehicle or a load from a vehicle wheel.

The upper member divides near the housing front wall of the damper housing. This means that the minimum necessary high tension steel sheet is used for the upper rear side member of the upper member. This leads to the cost reduction.

The fender bracket is disposed at the front outer wall section of the upper front side member on side of the division end. Although the fender bracket is provided on the surface facing in the outward direction of the vehicle, the accuracy with which the fender bracket is provided on the surface is more reliably ensured than if the fender bracket is preliminarily fixed on the non divided upper member.

In the invention defined in claim 3, the fender bracket is joined to both the front outer wall section and the lower member, such that a load applied to the fender bracket joined to the lower member can be dispersed directly to the lower member. This increases the attachment strength of the fender bracket to thereby ensure the appropriate support strength of the fender.

In the invention defined in claim 4, the lower member is the integrally plastically worked member, and overlaps the front outer wall section of the upper front side member from outside the vehicle and is joined to the front outer wall section. This arrangement eliminates a necessity of joining the lower member to the upper member with the extension member. This is, the elimination of the extension member reduced the number of parts as well as the cost.

In the step of joining the lower member to the side of the vehicle body, the upper front side member joined to the lower member is attached to the vehicle body without the need of the extension member.

In the invention defined in claim 5, the side beam member has the rear end fitting over and connected to the one end of the upper front side member, and the rear end has the fitting flange. The fitting flange projects and has the peripheral edge of the rear end spaced outward from the one end with the gap defined between the peripheral edge and the one end. Although, except for the fitting flange, the rear end contacts the one end of the upper front side member, a desired gap is formed between the peripheral edge of the rear end and an edge of the one end of the upper front side member, thereby facilitating a work of fitting the one end of the upper front side member into the rear end of the side beam member to improve the workability.

DESCRIPTION OF EMBODIMENT

A certain preferred embodiment of the present invention is described below with reference to the accompanying drawings.

Embodiment

Figure 1:
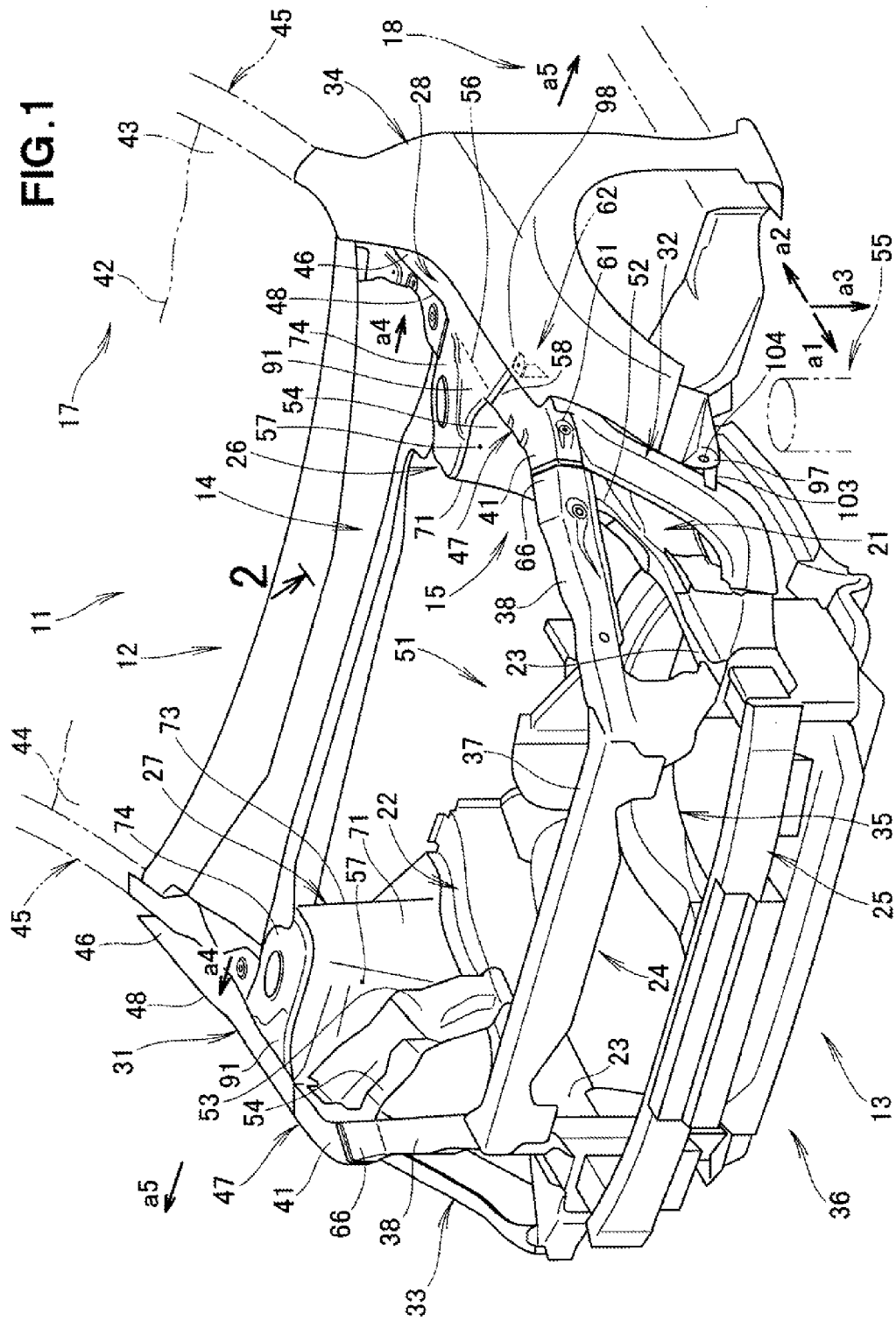
FIG. 1 is a perspective view of a front body using a vehicle body front structure in an embodiment of the present invention.

As shown in FIG. 1, a vehicle 11 includes a front body 13 of a vehicle body 12, a cowl 14, and a vehicle body front structure (vehicle body front mechanism 15) in an embodiment of the present invention.

The front body 13 includes left and right front side frames 21, 22 extending from a floor (underbody 18) of a passenger compartment 17 in a forward direction of the vehicle 11 (a direction of an arrow a1), a front bulkhead 24 disposed at front ends 23 of the front side frames 21, 22, a bumper beam 25, and upstanding damper housings 26, 27 disposed at the front side frames 21, 22.

The front body 13 includes wheelhouse upper members 28, 31 disposed above the front side frames 21, 22, wheelhouse lower members 32, 33, and front fenders 34. The front body 13 has left and right portions disposed in substantially symmetrical relationship with each other. Reference numeral 35 denotes a sub-frame.

In the vehicle body front structure 15, each of the wheelhouse upper members 28, 31 divides into front and rear sections extending in a front-rear direction, of the vehicle body. A length ratio of the front section to the rear section is about 3:7.

The front bulkhead 24 has an upper beam member 37 located on a front side 36 of the vehicle body 12. Left and right side beam members 38 extend from the upper beam member 37 in a rearward direction of the vehicle body 12 (a direction of an arrow a2). The wheelhouse upper members ("upper members") 28, 31 have their one ends 41 connected to the side beam members 38. A windshield 42 has its left, and right ends 43, 44 supported by front pillars 45 to which are connected the opposite ends of the wheelhouse upper members 28, 31.

Each of the wheelhouse upper members 28, 31 divides into an upper front side member 47 including the one end 41, and an upper rear side member 48 including the opposite end 46. The wheelhouse lower members 32, 33 each extend from the corresponding upper front side member 47 in a downward direction of the vehicle body, as shown by an arrow a3.

The wheelhouse upper members 28, 31 are disposed at top portions 54 of lateral sides 52, 53 of an engine compartment 51, and are joined to outer end portions 56 of the damper housings 26, 27 located at widthwise outer sides of the damper housings (as shown by arrows a4). The damper housings 26, 27 support suspensions 55. The wheelhouse upper members divide into the upper front and rear side members 47, 48 at locations close to housing front walls 57 of the damper housings 26, 27, which walls 57 have their front surfaces facing in the forward direction of the vehicle body 12 (the direction a1)

The upper front side members 47 include division ends 58 opposite the one ends 41 of the wheelhouse upper members 28, 31, and front outer wall sections 61 having surfaces facing in widthwise outward directions of the vehicle (a direction of arrows a5). The upper front side members 47 further include fender brackets 62 for mounting the fenders (front fenders) 34. The fender brackets 62 are disposed at the front outer wall sections 61 on sides of the division ends 58.

Figure 7:
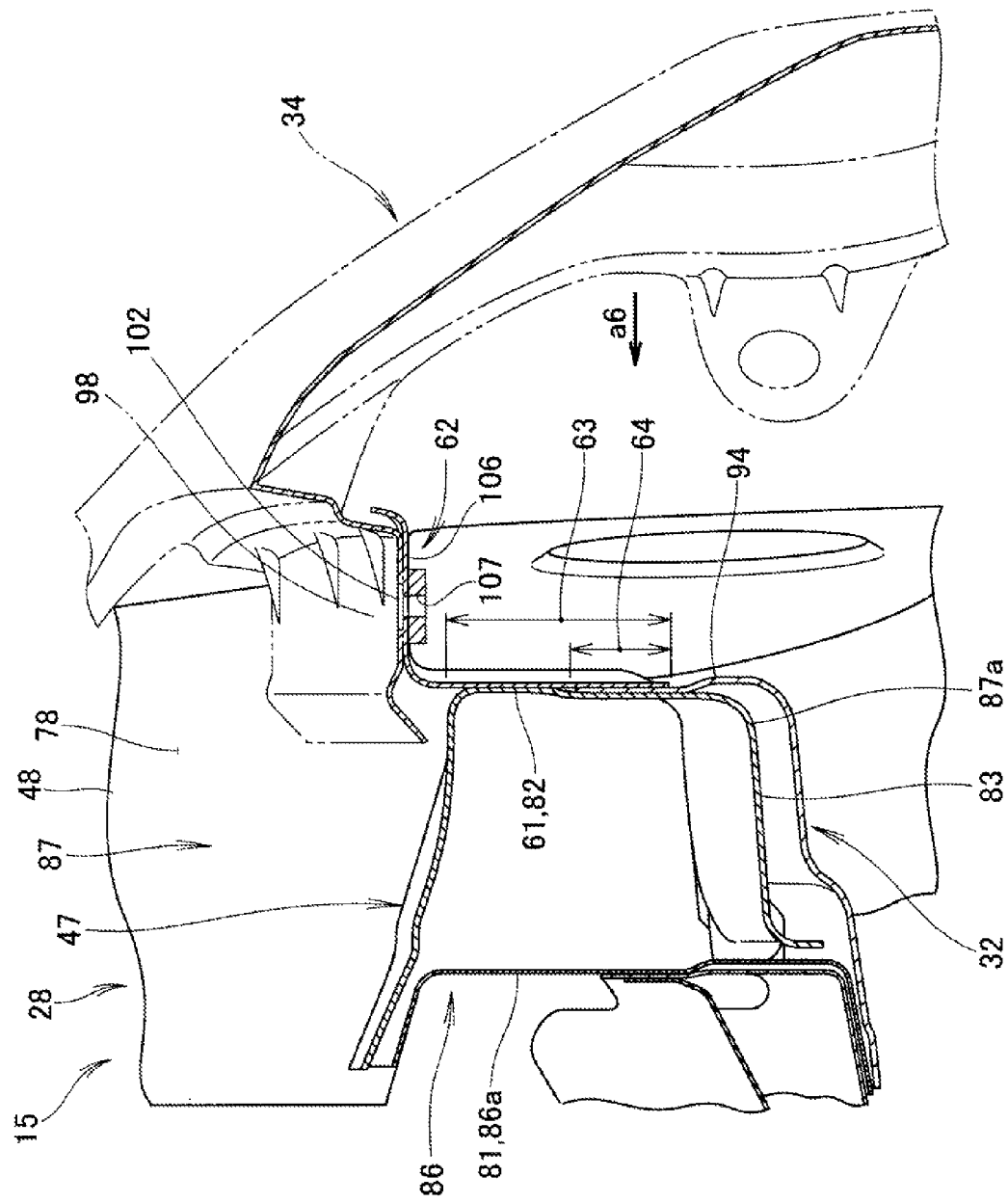
FIG. 7 is an enlarged cross-sectional view taken along line 7-7 of FIG. 4.
Figure 8:
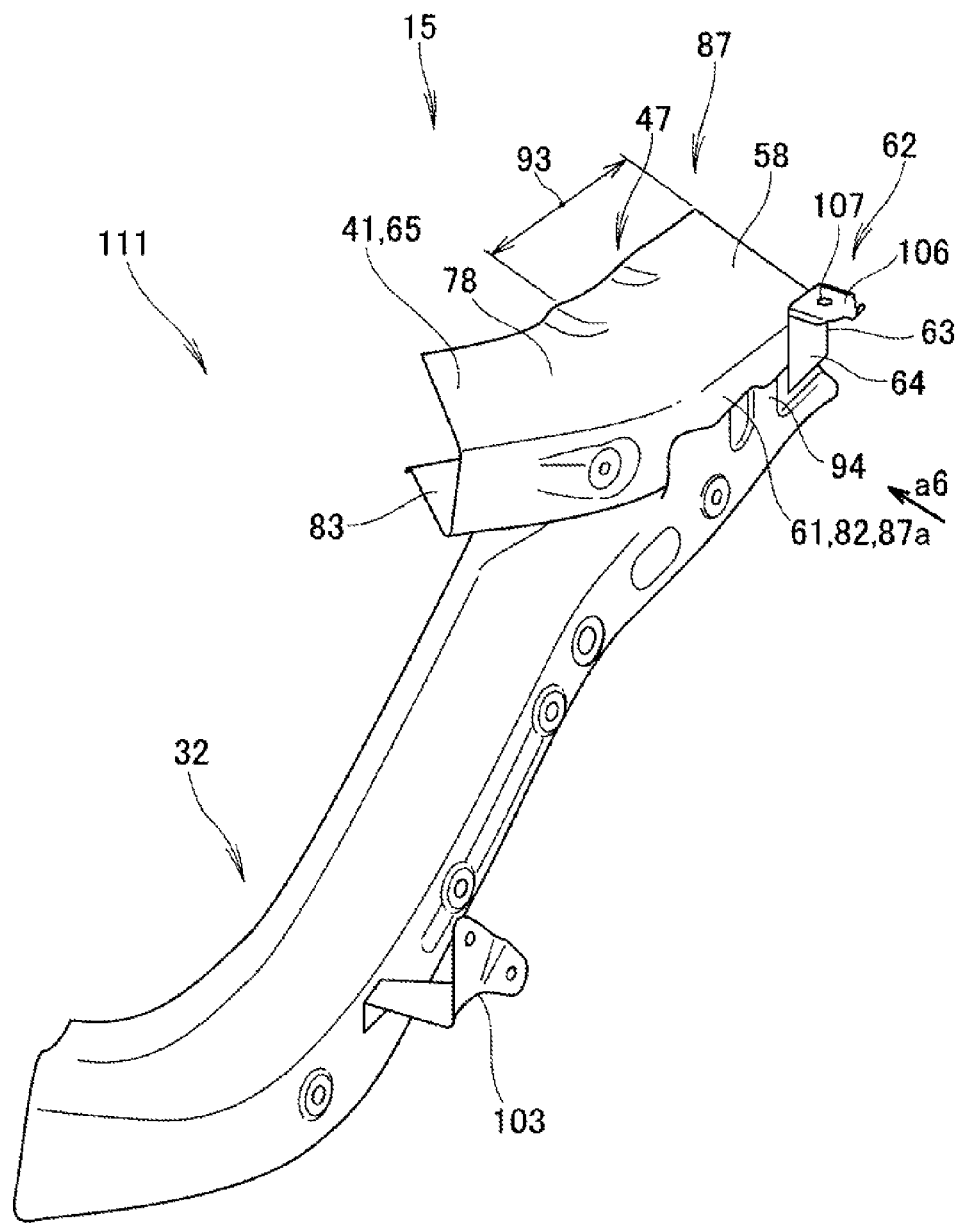
FIG. 8 is a perspective view illustrating a lower member being joined to an upper front side member of the upper member shown in FIG. 1.
Figure 9:
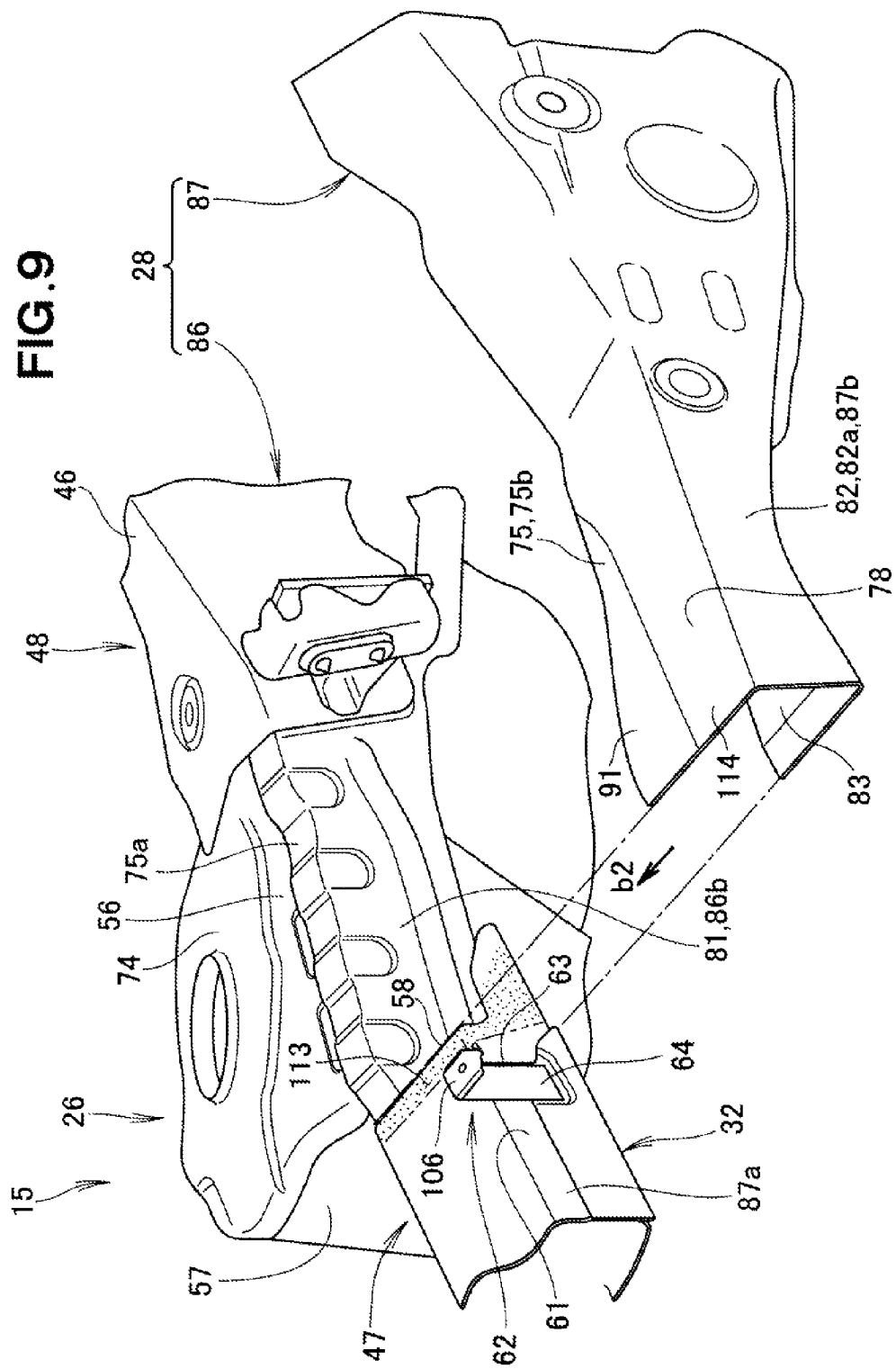
FIG. 9 is a perspective view illustrating an outer section of an upper rear side member being assembled to the upper front side member.

The fender brackets 62 are joined both to the front outer wall sections 61 and to the wheelhouse lower members 32, 33, as shown in FIGS. 7 to 9. More specifically, each of the fender brackets 62 includes a joined portion 63 joined to the front outer wall section 61, and the joined portion 63 includes a lower joined region (lower joined portion) 64 joined to the corresponding one of the wheelhouse lower members 32, 33.

Each of the wheelhouse lower members 32, 33 is an integrally plastically worked member joined from outside the vehicle body 12 (a direction of an arrow a6 in FIGS. 4 and 8) to the front outer wall section 61 in an overlapping relationship with the section 61.

Figure 6:
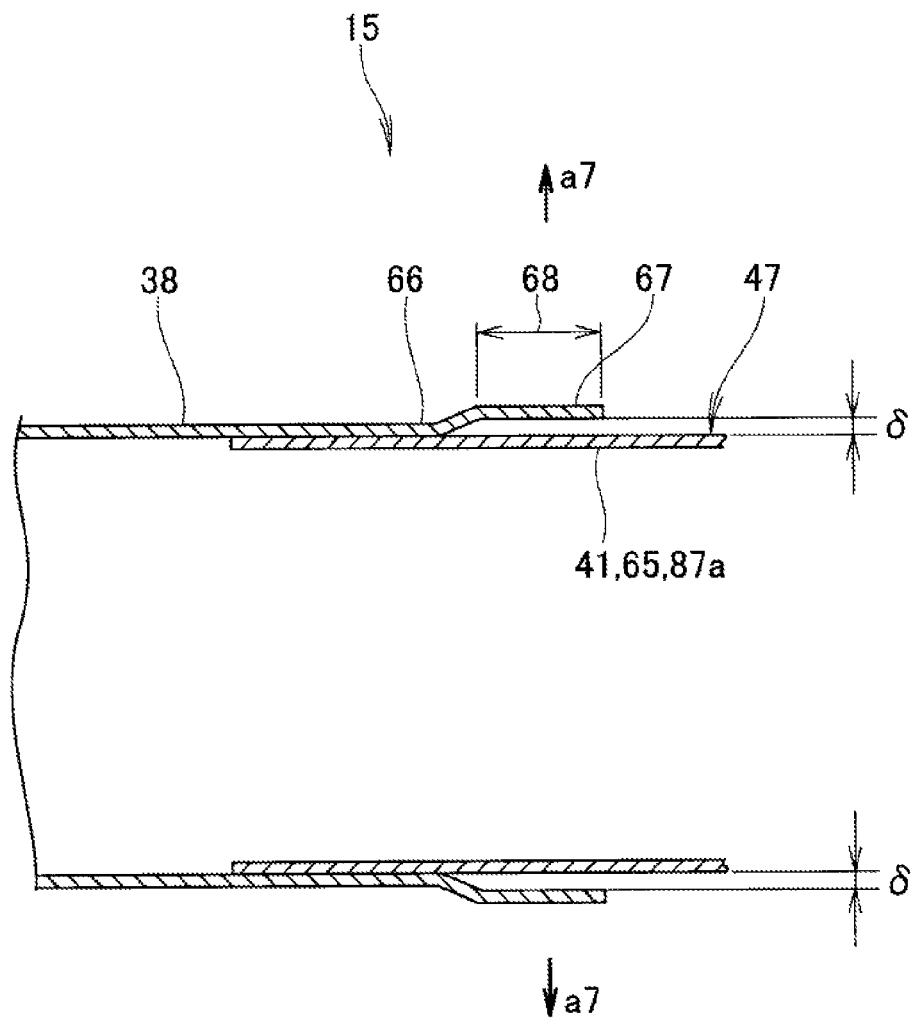
FIG. 6 is an enlarged cross-sectional view taken along line 6-6 of FIG. 4.

As shown in FIG. 6, the side beam member 38 includes a rear end portion 66 fitting over and connected to one end 65 of the upper front side member 47. The rear end portion 66 has a fitting flange 68 projecting and having a peripheral edge 67 of the rear end 66. The peripheral end (37 is spaced outward from the one end 41 or 65, as shown by an arrow 7, with a gap 6 formed between the peripheral edge 68 and the one end 41 or 65.

The "one end 65 of the upper front side member 47" is the one end 41 of the wheelhouse upper member 28. It is noted that the phrase "one end 65 of the upper front side member 47" is used in the description of the upper front side member 47.

Next, detailed discussions are made below as to the damper housings 26, 27, the wheelhouse upper members 28, 31, the upper rear side member 48, the upper front side member 47, the wheelhouse lower members 32, 33, the front fender (fender) 34, and the fender bracket 62.

Figure 10:
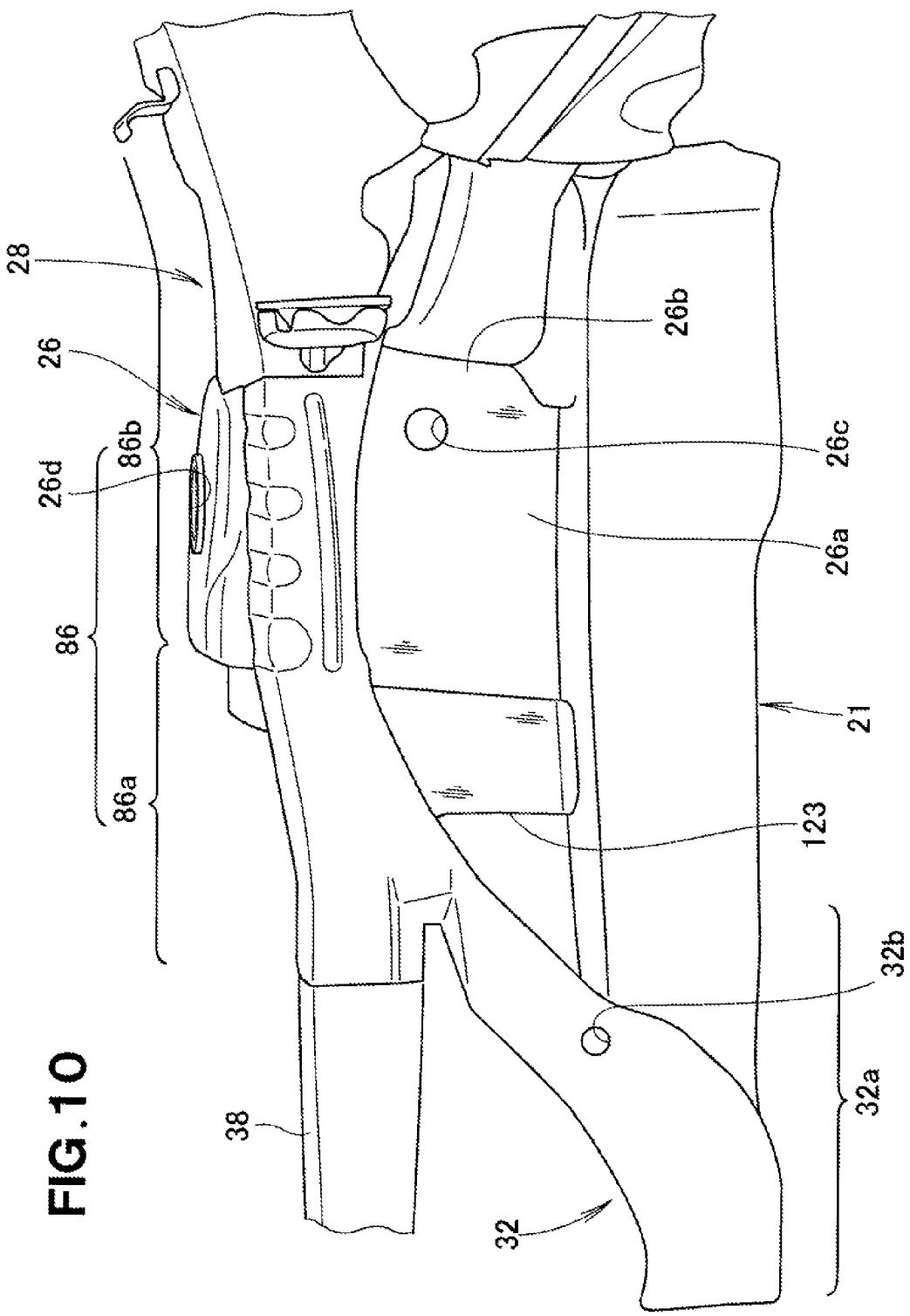
FIG. 10 is a side elevation view of an inner section and a lower member inner part.

As shown in FIG. 1, the damper housing 26 includes an inner wall 71 having its lower portion joined to the front side frame 21. The housing front wall 57 is contiguous with the inner wall 71. The damper housing 26 also includes a rear wall 73 and a top portion 74 contiguous with these walls 57, 73. The top portion. 74 has an upper surface facing an upward direction of the vehicle body 12. Joined to this top portion 74 is a central portion 75 (FIG. 4) of the left wheelhouse upper member 28. As shown in FIG. 10, the left damper housing 26 includes an upstanding housing inner wall 26a disposed widthwise inwardly of the vehicle and the housing inner wall 26a has a rear portion 26b defining a reference hole 26c. The right damper housing 27 has a substantially symmetrical relationship with the left damper housing 26 about the center of the vehicle body 12.

The upper member 28 extends to a substantially midpoint between the damper housing 26 and the front bulkhead 24 (FIG. 1) and has a closed cross-sectional shape defined by a top part 78, an inner wall part 81 (FIG. 7), an outer wall part 82 and a bottom part 83. The inner wall portion 81 has a surface facing the engine compartment 51 (FIG. 1), i.e., the inside of the vehicle 11. The outer wall part 82 includes the front outer wall section 61 of the upper front side member 47.

As shown in FIG. 9, the upper member 28 longitudinally divides into inner and outer sections 86.87 extending in the front-rear direction of the vehicle. These sections are joined together in a subsequent step to define the cross-sectional shape. The outer section 87 of the upper member 28 has a U-shaped cross-sectional shape.

Figure 4:
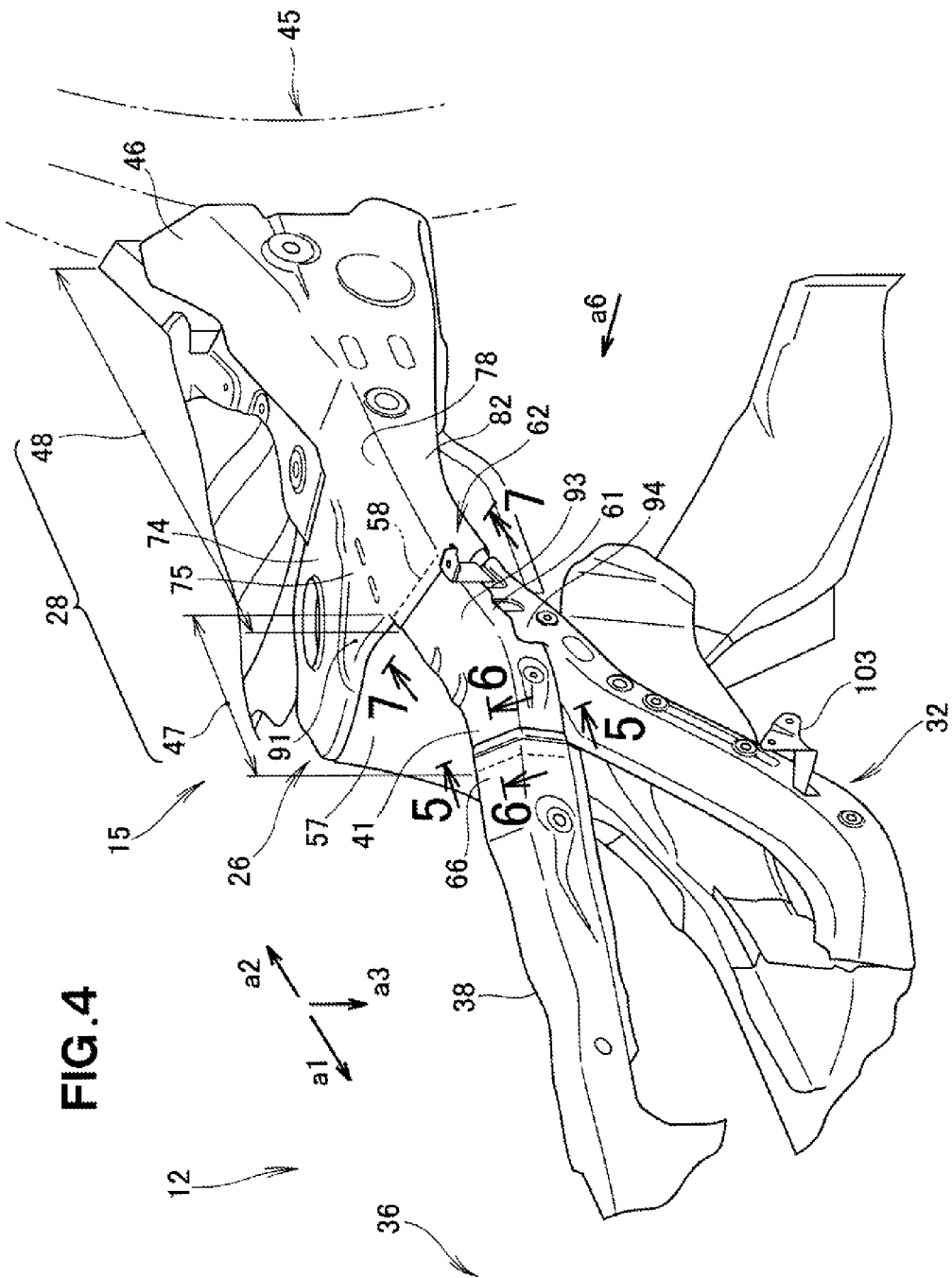
FIG. 4 is a perspective view of the vehicle body front structure shown in FIG. 1.

As shown in FIG. 4, the overall length of the upper member 28 extends in the front-rear direction of the vehicle body and divides at the ratio of about 7:3 such that the upper front side member 47 has a length which is 30% of the overall length of the upper member 28 and the upper rear side member 48 has a length which is 70% of the overall length of the upper member 28. The outer section 87 shown in FIG. 9 also divides at a ratio of about 7:3. As shown in FIGS. 9 and 10, the inner section 86 is integrally molded and has a front inner portion 86a, a rear inner portion 86b, a front outer section 87a, and a rear outer section 87b, respectively. The outer wall part 82 divides into the front outer wall section 61 and a rear outer wall section 82a.

As shown in FIG. 4, the upper rear side member 48 of the upper member 28 is disposed behind the housing front wall 57 of the damper housings 26, 27, as discussed above. The upper rear side member 48 has a closed cross-sectional shape defined by the rear inner portion 86b and the rear outer section 87b shown in FIG. 9, using a steel sheet of high tension.

As shown in FIG. 9, the rear outer section 87b of the upper rear side member 48 includes a damper housing joined portion 91 joined to the top portion 74 of the damper housings 26, 27 in an overlying relationship with the top portion 74.

As shown in FIG. 7, the upper front side member 47 of the upper member 28 is disposed in front of the housing front wall 57 of the damper housings 26, 27 and has a closed cross-sectional shape defined by the front inner portion 86a and the rear outer section 87a.

As shown in FIG. 8, the upper front side member 47 is formed using a common steel sheet and has a straight line portion 93 extending forwardly from the upper rear side member 48 in alignment with the upper rear side member 48. The outer wall part 82 in the straight line portion 93 includes a lower joined portion to which is joined an upper joined portion 94 of the wheelhouse lower members 32, 33.

As shown in FIG. 4, the lower member 32 extends from the straight line portion 93 to the front side frame 21 (FIG. 1) with the upper joined portion 94 overlapping the straight line portion 93 from outside the vehicle body 12 (in a direction of an arrow a6). The lower member 32 is formed using a common steel sheet to provide a cross-section taking the form of a hat having a flange. As shown in FIG. 1, the front fender 34 is fastened to the lower member 32.

Figure 2:
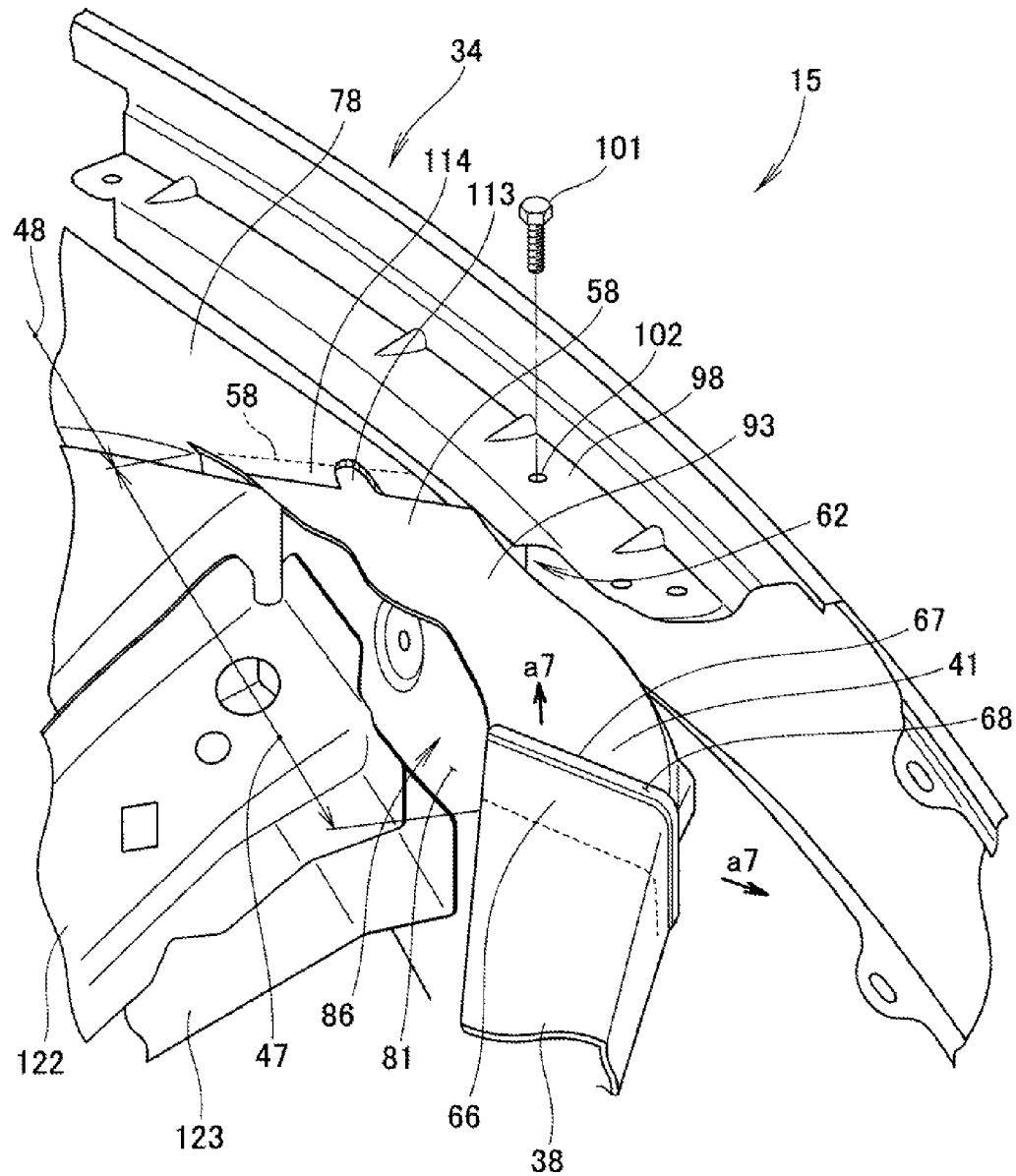
FIG. 2 is an enlarged view taken in a direction of an arrow 2 in FIG. 1.
Figure 3:
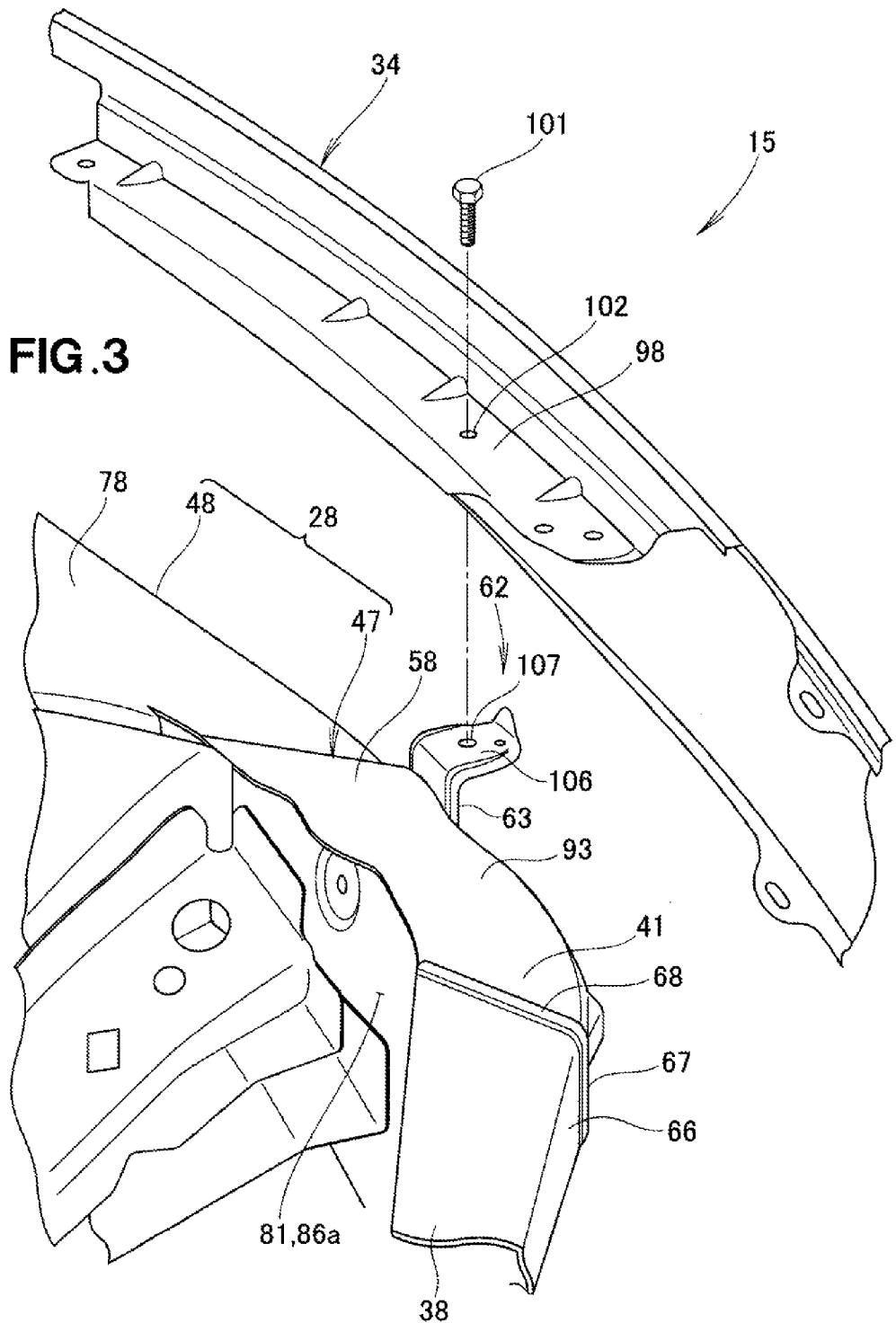
FIG. 3 is a perspective view illustrating a fender being attached to an upper member shown in FIG. 2.

As shown in FIG. 1, the front fender 34 includes a front fastened portion 97 attached to the lower member 32, and an upper fastened portion 98 attached to the upper member 28. As shown in FIG. 2, the upper fastened portion 98 has a hole 102 for allowing passage of an external thread member 101 which is to be fastened to the fender bracket (front bracket) 62. As shown in FIG. 1, the front fastened portion 97 has a hole 104 for allowing passage of an external thread member 101 which is to be fastened to the lower fender bracket (lower bracket) 103.

As shown in FIG. 7, the fender bracket (front bracket) 62 is of an L-shape and includes a fastened portion 106 contiguous with and generally perpendicular to the joined portion 63 attached to the outer wall part 82. The fastened portion 106 has an internal thread portion 107 formed therein.

Figure 11:
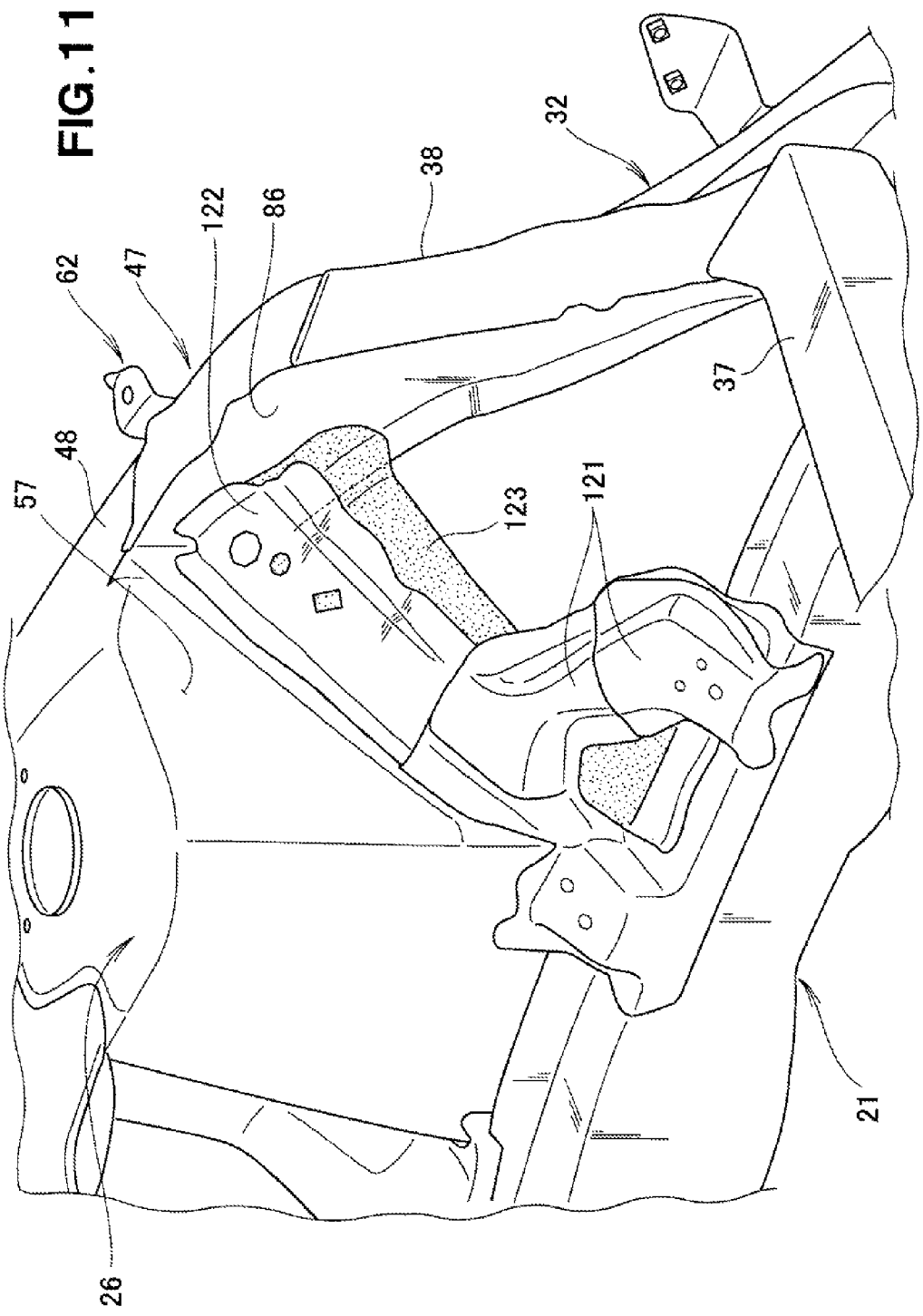
FIG. 11 is a view illustrating the upper front side member, the upper rear side member and an upper support reinforcement member being attached to one another.

In the vehicle body front structure, the front fender 34 is supported at the two points, i.e., the front and upper fastened portions 97, 98, with the fender bracket 62 disposed rearward as far as possible to prevent a space between the front fender 34 and a fender bracket different from the fender bracket 62, from being too large to ensure a rigidity of an outer sheet of the fender. The division lines (division location) are located widthwise outwardly of the housing front walls 57 of the damper housings 26, 27. The division line is connected via the inner section 86 to an upper support reinforcement member 122 connected to a transmission mount reinforcement member 121 (FIG. 11). In addition, the division line, which is a joint between the upper front side member 47 and the upper rear side member 48, has an increased rigidity. The division line thus provides a structure having an appropriate strength to support the fender. Reference numeral 123 denotes an upper support member.

Next, a brief discussion is made below as to a method for assembling the wheelhouse upper members 28, 31.

As shown in FIG. 8, first, the upper front side member 47, the lower member 32 and the fender bracket (lower bracket) 103 are assembled together. The lower joined portion 64 of the joined portion 63 of the fender bracket 62, the lower member 32 and the upper front side member 47 are spot-welded together in an overlapping relationship, as shown in FIG. 7, to provide a three-layered spot weld. The completed assembly as shown in FIG. 8 is hereinafter referred to as "upper front/lower small assembly 111".

As shown in FIGS. 9 and 10, the upper front/lower small assembly 111 (FIG. 8) is then attached to the inner section 86 and a lower member inner part 32a on the basis of the reference hole 26c of the housing inner wall 26a of the damper housing 26, a burred opening 26d of the top portion (damper base) 74 of the damper housing 26, and a central reference hole 32b of the lower member inner part 32a. The side beam member 38 (FIG. 1) and the upper rear side member 48 are not yet attached.

Figure 5:
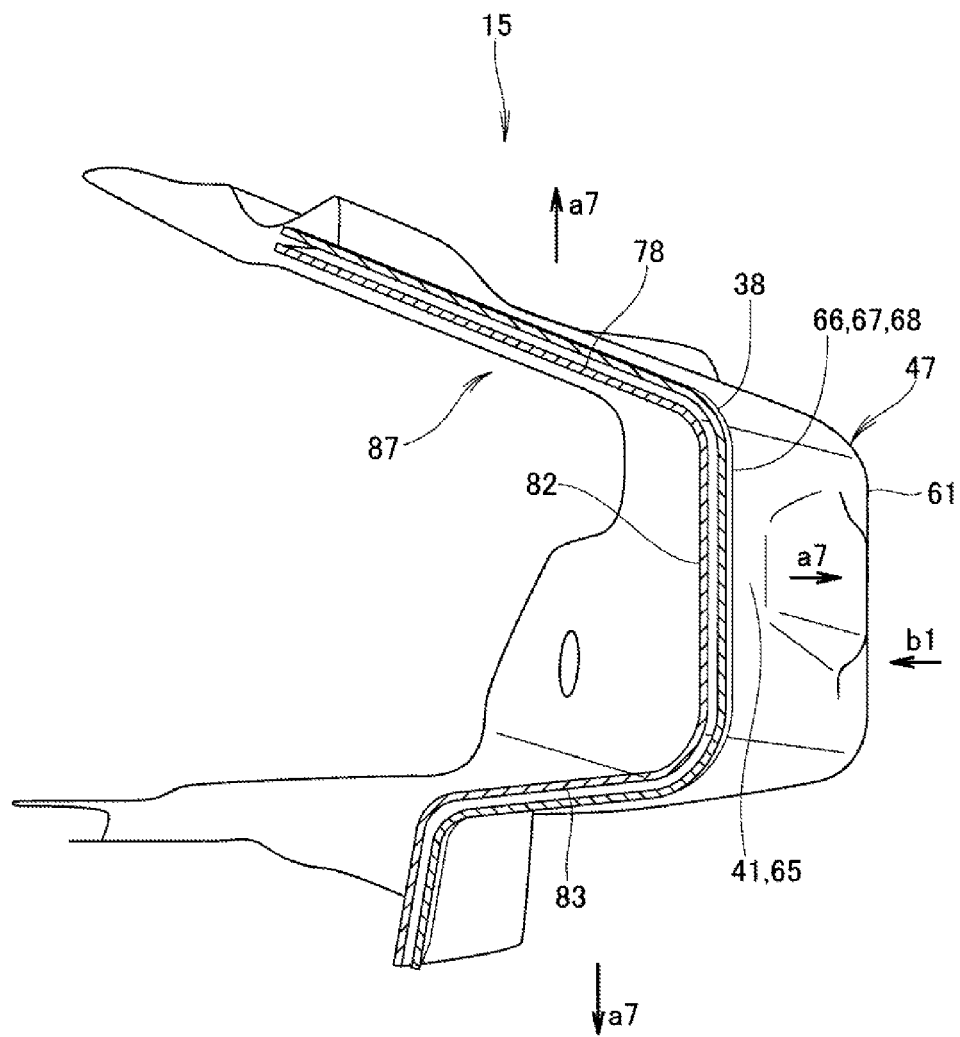
FIG. 5 is an enlarged cross-sectional view taken along line 5-5 of FIG. 4.

Thereafter, the side beam member 38 is assembled between the front bulkhead 24 and the upper front side member 47. As shown in FIGS. 5 and 6, the assemblage of the side beam member 38 involves attaching the side beam member 38 to the upper front side member 47 from the widthwise, outward side of the vehicle (a direction of an arrow b1). The fitting flange 68 enables the side beam member 38 to easily fit over the upper front side member 47 without little or no interference.

Finally, as shown in FIG. 9, the rear outer section 87b of the upper rear side member 48 is assembled to the front outer section 87a. The assemblage of the rear outer section 87b involves placing a joining end portion 114 of the rear outer section 87b on a lap area 113 (shown by a dot pattern) of the front outer section 87a of the upper front side member 47.

The advantage of the vehicle body front structure 15 in the embodiment is discussed below.

In the vehicle body front structure, the wheelhouse upper members 28, 31 divide into the upper front side members 47 and the upper rear side members 48, such that during the attachment of the wheelhouse lower members 32, 33, the wheelhouse lower members 32, 33 are joined to the upper front side members 47. This allows the fender bracket 62 to be more accurately positioned relative to the hole 102 of the front fender 34 than if the fender bracket 62 is attached to the outer section 87 which is to be assembled in the final step.

As discussed above, the vehicle body front structure does not require another extension member as found in the prior art. This leads to reduction in the number of parts of the structure and reduction in the number of steps of manufacturing the structure.

INDUSTRIAL APPLICABILITY

The present invention is preferably used for an automobile.

REFERENCE SIGNS LIST

11 . . . vehicle, 12 . . . vehicle body, 15 . . . vehicle body front structure, 24 . . . front bulkhead, 26, 27 . . . damper housings, 28, 31 . . . wheelhouse upper members, 32, 33 . . . wheelhouse lower members, 36 . . . front side of the vehicle body, 37 . . . upper beam member, 38 . . . side beam member, 41 . . . one end of the upper member, 42 . . . windshield, 43 . . . left end of the windshield, 44 . . . right end of the windshield, 45 . . . front pillar, 46 . . . opposite end of the upper member, 47 . . . upper front side member, 48 . . . upper rear side member, 51 . . . engine compartment, 52, 53 . . . lateral sides of the engine compartment, 54 . . . top portion of the lateral side, 55 . . . suspension. 56 . . . outer end portion of the damper housing, 57 . . . housing front all of the damper housing, 58 . . . division end of the upper front side member, 61 . . . front outer wall section of the upper front side member, 62 . . . fender bracket, 63 . . . joined portion of the fender bracket, 64 . . . the remaining portion (lower joined portion) of the fender bracket, 65 . . . one end of the upper front side member, 66 . . . rear end of the side beam member, 67 . . . peripheral edge of the rear end of the side beam member, 68 . . . fitting flange, δ . . . gap between the side beam member and the upper front side member

The invention claimed is:

1. A vehicle body front structure comprising:
a bulkhead disposed at a front side of a vehicle body and extending in a widthwise direction of a vehicle;
left and right side beam members extending from an upper beam member of the bulkhead in a rearward direction of the vehicle body;
front pillars supporting left and right ends of a windshield; and
left and right upper members having one ends connected to the side beam members and opposite ends connected to the front pillars,
wherein each of the left and right upper members divides into an upper front side member and an upper rear side member, the upper front side members of the left and right upper members having the one ends, the upper rear side members of the upper members having the opposite ends, and wherein left and right lower members extend from the upper front side members in a downward direction of the vehicle body,
wherein the respective left and right upper members are disposed at top portions of opposite lateral sides of an engine compartment, and joined to widthwise outer sides of left and right damper housings supporting suspensions, the damper housings including housing front walls having front surfaces facing in a forward direction of the vehicle body, the left and right upper members dividing into the upper front side members and the upper rear side members at locations close to the housing front walls of the damper housings, and
wherein the upper front side members include division ends located on sides of the one ends, and front outer wall sections having surfaces facing in widthwise outward directions of the vehicle, and fender brackets for mounting fenders, the fender brackets being disposed at the front outer wall sections on sides of the division ends.

2. The structure of claim 1, wherein the fender brackets are joined to the front outer wall sections and to the lower members.

3. The structure of claim 1, wherein the lower members are integrally plastically worked members, the lower members overlapping the front outer wall sections of the upper front side members from outside the vehicle and being joined to the front outer wall sections.

4. The structure of claim 1, wherein each of the left and right side beam members has a rear end fitting over and connected to the one end of the upper front side member, the rear end having a fitting flange, the fitting flange projecting and having a peripheral edge of the rear end, the peripheral edge being spaced outward from the one end with a gap defined between the peripheral edge and the one end.

* * * * *